Nov. 6, 1962 A. HAMORI 3,062,927
PULSE REPEATER TESTING ARRANGEMENT
Filed May 8, 1961 3 Sheets-Sheet 1

INVENTOR
A. HAMORI
BY R. B. Ardis
ATTORNEY

PULSE REPEATER TESTING ARRANGEMENT

Filed May 8, 1961 3 Sheets-Sheet 2

INVENTOR
A. HAMORI
BY R. B. Ardis
ATTORNEY

INVENTOR
A. HAMORI
BY R. B. Ardis
ATTORNEY

United States Patent Office 3,062,927

Patented Nov. 6, 1962

3,062,927

PULSE REPEATER TESTING ARRANGEMENT

Andras Hamori, Cambridge, Mass., assignor to Bell Telephone Laboratories, Incorporated, New York, N.Y., a corporation of New York Filed May 8, 1961, Ser. No. 108,567
10 Claims. (Cl. 179—175.31)

This invention relates to communication systems involving unattended repeaters and more particularly to improved means for locating a faulty or inoperative one of a plurality of unattended pulse regenerative repeaters which are serially distributed over a transmission path.

A principal advantage of digital data transmission lies in its ability to transmit information over large distances without significant increases in noise and distortion. In such a system, the information to be transmitted may, for example, first be encoded into a binary train of "ON" and "OFF" pulses. Since the receiving apparatus is synchronized with the pulse transmitter, it is only necessary for the receiver to "decide" whether an "ON" pulse or an "OFF" pulse was transmitted at a given time. In this manner it may completely reconstruct the received signal into its original form. Over long distances, pulse repeaters are often employed at intervals along the transmission path to regenerate the signal for retransmission to the next repeater. Unless one of the repeaters or the receiver makes a mistake as to whether an "ON" or "OFF" pulse was originally transmitted at a particular time, the signal may be reproduced in its original form regardless of the distance over which it was transmitted.

Such pulse repeaters normally achieve the desired regeneration by periodically comparing the magnitude of the incoming signal with a threshold value—retransmitting an "ON" pulse if the incoming signal is greater than the threshold and an "OFF" pulse if it is less. The so-called pseudo-ternary pulse systems employ "ON" pulses of both positive-going and negative-going polarity along with the "OFF" pulses (usually in order to partially cancel any direct-current component of the pulse train) and, consequently, the necessary repeaters require two thresholds to achieve regeneration—one for the positive-going pulses and the other for the negative-going pulses.

Since such repeaters are usually remote from the transmitting and receiving terminals of the transmission path and are often accessible only with difficulty, it is desirable that means be provided to test the operating characteristics of each repeater from the terminals of the repeatered path.

One method of testing which makes this possible has been disclosed in copending application Serial No. 77,192 filed on December 20, 1960 by J. S. Mayo. This prior testing arrangement operates by first transmitting a testing pulse train composed of recurrent groups of unipolar pulses (i.e., all pulses having the same polarity) over the repeatered transmission path, then measuring the errors of regeneration (if any) committed by each repeater. Because of its unipolar "burst" configuration, the testing pulse train suggested in the Mayo application has both a direct-current component and a low frequency "identification tone" component. The identification tone component is used to select and identify the particular repeater or group of repeaters being tested and has a frequency equal to the frequency of repetition of the unipolar pulse groups. By increasing the number of pulses in each group, the magnitude of both the direct-current component and the identification tone component of the testing pulse train is increased. The usual type of transmission facility will not transmit the direct-current component, however, due to serially connected transformers, blocking capacitors, etc. This component is, therefore, effectively deleted from the testing signal before it arrives at the repeater input, causing the testing pulse train to be shifted with respect to the threshold values. This shift, if large enough, results in the repeater making errors of "omission" or of "commission." In accordance with a feature of the Mayo disclosure, by increasing the direct-current component of the testing signal until errors of regeneration are detected, a measure of the margin of operation of each repeater is obtained.

While the testing arrangement proposed by Mayo has proven to be quite effective, the generator which was disclosed for producing a testing pulse train of this type is rather complex. This problem becomes even more troublesome when the prior testing arrangement is used in conjunction with those ternary transmission systems which are capable of transmitting only those pulse trains which contain pulses of both polarities. Because of this added requirement, the unipolar pulse groups suggested by Mayo must be multiplexed with sufficient pulses of the opposite polarity to produce a transmittable signal, thereby increasing the complexity of the necessary test signal generator.

It is, therefore, a principal object of this invention to generate more simply and more economically a testing pulse train for locating a faulty or inoperative pulse regenerative repeater.

A further object of the present invention is to generate an improved testing pulse train which provides increased accuracy of fault location by increasing the magnitude of that signal which indicates errors of regeneration.

An additional disadvantage of the fault location signal generator which was disclosed in the Mayo application lies in the difficulty of selecting the desired form of testing pulse train. In the prior generator it is necessary to correctly position a plurality of switches each time the form of the pulse train is to be altered, thereby considerably complicating the testing procedure.

It is, therefore, a still further object of the present invention to facilitate operation of a fault location arrangement.

The present invention is particularly, although in its broader aspects not exclusively, applicable to arrangements for locating a faulty or inoperative one of a plurality of pulse regenerative repeaters which are employed in a pseudo-ternary digital communications system. In a principal aspect, the present invention takes the form of an improved and simplified signal generator capable of producing a pulse train having a low frequency component of adjustable magnitude and frequency. In accordance with a principal feature of the invention, such a pulse train is produced by first generating repetitious patterns of pulses, each of these patterns comprising $m$ pulses of one polarity and $n$ pulses of the opposite polarity, $m$ and $n$ being unequal integers, such that the repetitious patterns have a net direct-current component, then repeatedly inverting the polarity of all of the pulses in these repetitious patterns at a particular frequency of inversion thereby producing a pulse train having an "identification tone" component at the inversion frequency. In accordance with the invention, means are provided for varying the repetition rate of the patterns in order to vary the magnitude of the identification tone component and for varying the rate of inversion in order to vary the frequency of the identification tone component. Since the low frequency components of this pulse train, like the direct-current component of the Mayo proposal, are substantially suppressed during transmission, they are capable of deleteriously affecting repeater operation for marginal checking purposes as well as providing the requisite component for fault location.

A more complete understanding of the operation of the invention may be obtained by considering the following detailed description of a specific embodiment of the invention. In the drawings.

Figure 1:
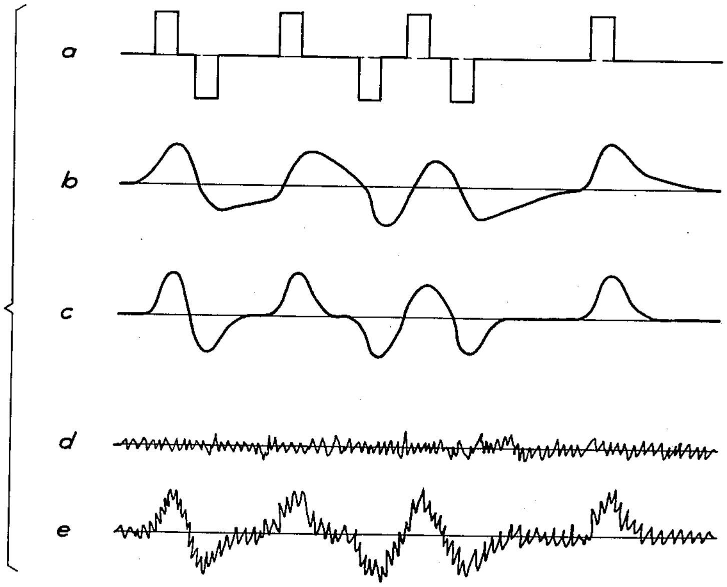
FIG. 1 illustrates several wave forms appearing at various points along a typical bipolar pulse transmission path.

In order to understand more clearly the operation of the invention it is first necessary to study a typical pseudoternary pulse transmission system. In FIG. 1, line *a*, of the drawing is shown a typical wave form which might appear at the transmitting terminal of the transmission path or at the output terminal of a properly functioning repeater. Because of the transmission facility's increased attenuation to the high frequency components of this pulse train, the wave form appearing at the input of the next succeeding repeater is "smoothed" considerably as illustrated by line *b* of FIG. 1. After passing this signal through an equalizer which intends to restore the original shape the signal appears as shown on line *c* of FIG. 1. Beside the aberrations caused by the transmission characteristics, random noise or crosstalk of the type shown in line *d* of FIG. 1 may also be superimposed upon the signal. In consequence, a signal of the type shown in FIG. 1, line *e* may appear at the input of the regenerator.

Figure 2:
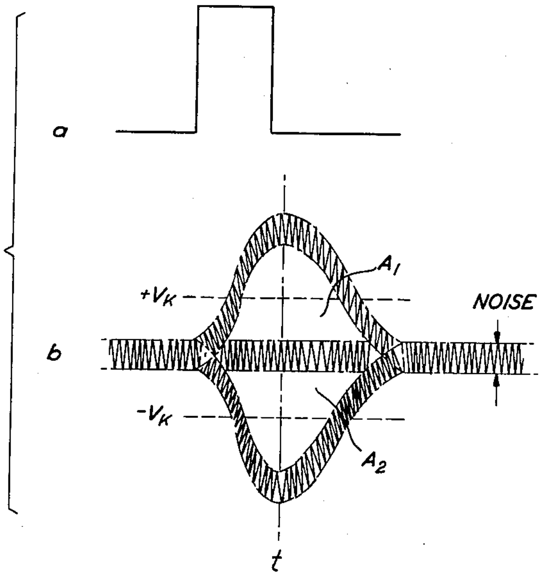
FIG. 2 illustrates the possible wave forms arriving at a typical repeater input.

The repeater then must analyze a highly distorted wave form of the type shown in line *e* of FIG. 1 and determine from this whether or not a pulse was transmitted at a particular instant. The difficulty of making such a decision is illustrated by FIG. 2. In FIG. 2, line *a* shows a square wave output pulse of the type which might have been sent over the transmission facility. Line *b* illustrates the combination of possibilities between which the repeater must make its decision. In essence, at a particular time, a positive pulse, a negative pulse, or no pulse at all might have been transmitted. The vertical line, *t*, designates the time at which the repeater makes its decision. In making this decision the repeater decides whether the input voltage is above the positive threshold $+V_k$, below the negative threshold $-V_k$, or somewhere between those two values. Because the noise exists on the input terminals of the repeater regardless of whether a positive pulse, a negative pulse, or no pulse at all was transmitted, the intersections of the time line, *t*, with each of the two threshold lines, $+V_k$ and $-V_k$, must lie within the two areas, $A_1$ and $A_2$, respectively, in order to insure that the decision will be correctly made. The shape of these areas may also be affected by the leading or trailing edges of adjacent pulses, but for our purposes, these and other factors need not be considered.

Since an increased amount of noise or crosstalk effectively causes a shrinking of these areas, it is desirable that the aforementioned intersections are centered in the areas in order to insure optimum performance. Should either of these intersections move substantially "off-center," due to the deterioration of a component within the repeater, for example, the repeater's propensity for committing errors is increased. In such a situation, the repeater is said to be "marginal."

Quite often such pulse regenerative repeaters are "self-synchronizing," that is, they derive the position of the time line, *t*, from the incoming pulse train. This is usually accomplished by applying the incoming pulse train to a "ringing circuit" to develop a sinusoidal oscillation having a frequency related to the basic pulse repetition rate. This sinusoidal voltage may be used to develop synchronizing pulses which position the decision time, *t*. Such repeaters require an input pulse train having a sufficient pulse density to maintain the ringing circuit in oscillation. Another feature often added to pulse regenerative repeaters in an automatic threshold control. This device positions the threshold lines $+V_k$ and $-V_k$ properly with regard to the magnitude of the incoming pulses. This may be accomplished by detecting the magnitude of the peak values of pulses of one polarity and then positioning the threshold values at some fractional value of this magnitude. Should either the automatic threshold control or the self-synchronizing feature of a particular repeater become faulty, the repeater may become marginal due to the resultant shift of the decision intersections with respect to the incoming pulse train.

Any fault location testing signal which might be proposed is contrained to meet the requirements of the repeaters. The pulses in the train must be positioned to conform with a clocking signal or with the resonant frequency of the ringing circuit in a self-synchronizing device. The pulse train must have a sufficient pulse density to keep the ringing circuit in oscillation and, in the case of systems having repeaters equipped with the usual type of automatic threshold control, the testing signal must contain pulses of both polarities in order to maintain the proper threshold value.

Figure 3:
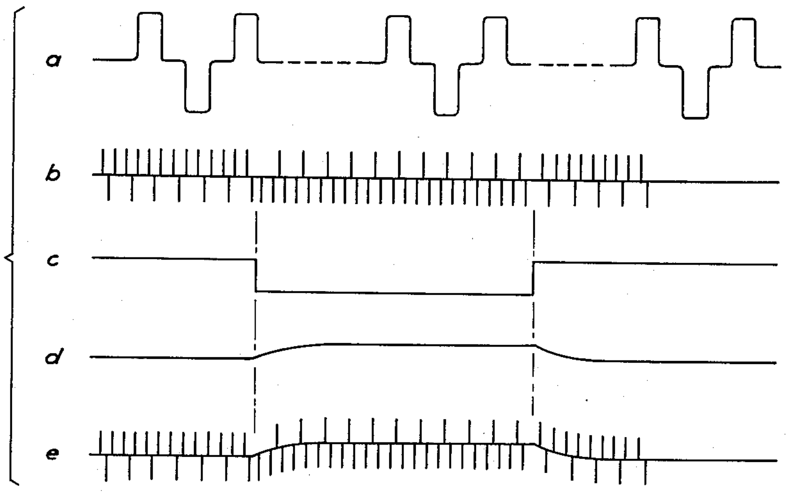
FIG. 3 illustrates the composition of a typical test signal for locating a faulty repeater in accordance with the invention.

As contemplated by this invention, an improved fault location signal is constructed by first generating repetitious patterns of pulses. These patterns, one form of which is shown on line *a* of FIG. 3, are each made up of *m* pulses of one polarity and *n* pulses of the opposite polarity. In line *a* of FIG. 3, each pattern of pulses is composed of a negative-going pulse flanked on each side by a positive-going pulse. The pulse train comprising these repetitious patterns has a net positive direct-current content, the magnitude of which is dependent on the repetition rate of the patterns. By inverting all of the pulses in this pulse train at a frequency of inversion which is considerably lower than the pattern repetition rate, a testing pulse train of the type represented by line *b* of FIG. 3 is produced. Since the direct-current content of the original pulse train is also inverted at the lower frequency, this pulse train contains a square wave component similar to that shown in line *c* of FIG. 3.

Because the frequency attenuation characteristics of the transmission path considerably suppress the lower frequency components of this square wave during transmission, the "zero value" of the pulse train which appears at the input of each repeater is caused to alternately shift with respect to the threshold values. The manner in which this shift takes place may be appreciated by adding to the pulse train of FIG. 3, line *b*, a wave form like that shown in FIG. 3, line *d*. This wave form represents an inversion of that portion of the transmitted pulse train which was deleted by the transmission line frequency attenuation characteristics. The sum of the pulse train shown on line *b* of FIG. 3 and the wave form of line *d* of FIG. 3 is shown on line *e* of FIG. 3. Line *e*, then, represents the pulse train as received by the decision-making circuit of the regenerative repeater. As can be seen from the figure, if the shifts with respect to the threshold values are large enough, errors of omission or commission may result. For instance, if the pulse train is shifted downward far enough, some of those positive-going pulses which were transmitted may not be of sufficient magnitude to rise above $+V_k$ and, consequently will not be regenerated. Similarly, negative-going noise impulses may cause the repeater to generate negative-going pulses where none were actually transmitted. Since the magnitude of the low frequency square wave components may be increased by increasing the pattern repetition rate of the original wave form shown in line *a* of FIG. 3, it is possible to induce the repeaters to commit errors of pulse regeneration and consequently to measure the margin of operation of the repeaters.

In terms of FIG. 2, the intersections remain in their original position but the pulse train itself is shifted alternately up and down at the inversion frequency. By determining how far it is possible to shift the pulse train with respect to the intersections without inducing errors, it is possible to determine how well the intersections are positioned with respect to an unshifted train of pulses. Should the repeater begin to commit errors with only a small shift, it is determined that an unusually small amount of added noise or crosstalk will cause errors of regeneration and that the repeater may need to be replaced or repaired.

Figure 4:
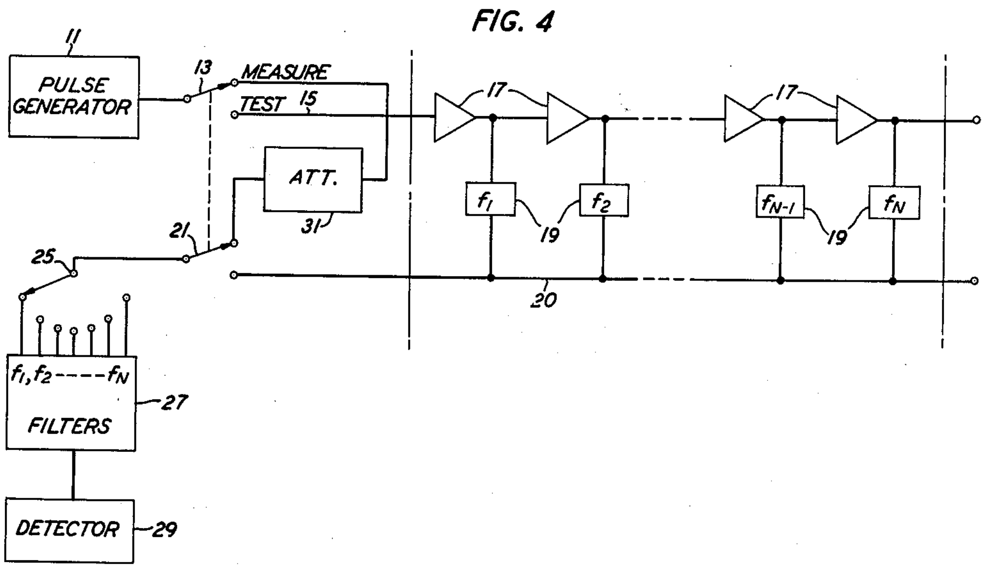
FIG. 4 illustrates a communications system employing the invention.

FIG. 4 of the drawings illustrates a fault location system contemplated by the invention. In FIG. 4, the output of testing pulse train generator 11 is connected to the input of transmission line 15 by means of switch 13 whenever switch 13 is in the lower (Measure) position. Transmission line 15 is equipped with a plurality of pulse regenerative repeaters 17 which are serially connected along the transmission path. A band-pass filter 19 is connected between the output of each repeater and a return transmission path 20. Each of these band-pass filters is responsive to a frequency which is peculiar to and indicative of the repeater to whose output it is connected. Return transmission path 20, which may be provided with "loading coils" for improved low-frequency transmission, is connected whenever switch 21 is in the lower (Measure) position to a detector 29 by means of switch 21 and one of a plurality of filters 27 which is selected by a multiple position switch 25. Switches 13 and 21 are single-pole, double-throw switches which are ganged together such that when switch 13 connects the pulse generator 11 with transmission line 15, switch 21 connects multiple-position switch 25 with the return transmission path 20. When in the upper (Test) position, switches 13 and 21 connect the output of pulse generator 11 with the detector by means of a circuit path comprising one of the filters 27, the multiple-position switch 25, switch 21, a calibrating attenuator 31, and switch 13.

In conducting the fault location operation, switches 13 and 21 are placed in the upper (Test) position. In most cases it will be most expedient to first check the overall transmission path since if it operates correctly in its entirety each one of the plurality of repeaters must be operating satisfactorily. To achieve this, multiple-position switch 25 is positioned such that a filter 27 is selected which is responsive to the frequency $f_n$, which is identical to the responsive frequency of the filter 19 connected to the output of the most distant repeater. Pulse generator 11 is then adjusted such that the frequency of the pulse train's square wave component is equal to $f_n$. Since the frequency of the square wave component has been adjusted to be equal to the frequency of the selected band-pass filter 27, the testing pulse train contains a sinusoidal component (the fundamental of the square wave component) which will pass through the filter. The magnitude of this sinusoidal component is measured by the detector 29. The pattern repetition rate of the test signal is also adjusted to its minimum value—that is, to provide a test signal having the minimum pulse density required by the repeater. Switches 13 and 21 are then moved to the (Measure) position. The testing signal is thereby applied to the input of the transmission path. Unless the transmission facility is seriously impaired, at this low pulse density the repeaters should be able to transmit the test signal without error; consequently, the testing pulse train will appear at the output of each repeater in substantially the same form as it appears at the output of generator 11. Since the inversion frequency has been adjusted such that the pulse train contains a square wave component having a frequency substantially identical to $f_n$, the frequency to which the last filter is responsive, a sinusoidal signal whose magnitude is directly related to the magnitude of the $f_n$ component of the pulse train will pass through the filter 19 which is attached to the furthest repeater and will be returned along transmission path 20 so that its relative magnitude may be measured by the detector 29. At this minimum pulse density, the attenuator 31 is then adjusted such that the detector readings are the same for both the (Measure) and (Test) positions.

The pattern repetition rate of the testing pulse train may then be increased in steps. After completing each incremental increase, the ganged switches 13 and 21 are placed in both the (Measure) and the (Test) positions to insure that the readings in both positions remain substantially equal. The two readings should remain substantially identical until one or more of the repeaters begins to commit errors of omission or commission. If errors are detected before the pattern repetition rate (and consequently the magnitude of the square wave component) becomes larger than a value which would normally be expected to cause errors, the transmission line is shown to be marginal—if not, the entire transmission path is operating satisfactorily. The particular repeater which is causing the difficulty, if any, may be located by shifting the testing point, that is by shifting the inversion frequency to correspond to the band-pass frequency of a filter located at a more nearby point on the transmission path.

Figure 5:
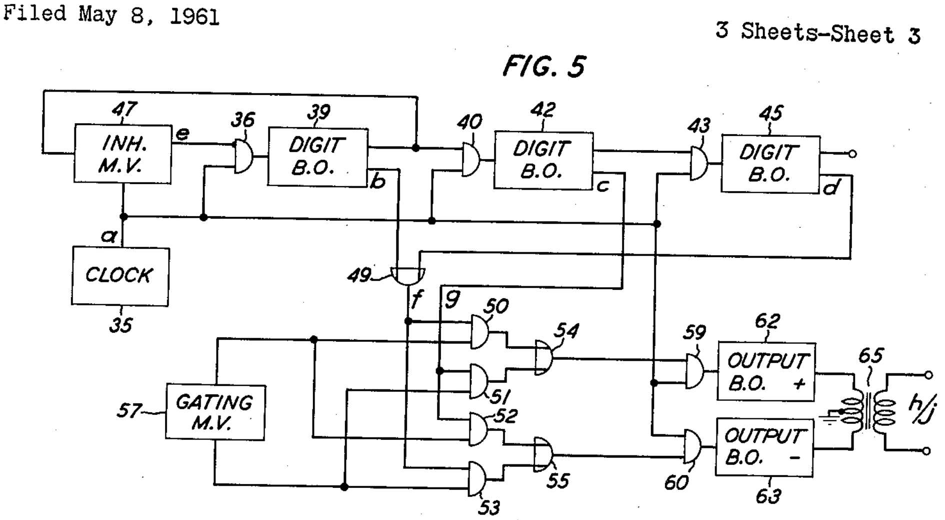
FIG. 5 is a block diagram of an improved test signal generator as contemplated by the invention.
Figure 6:
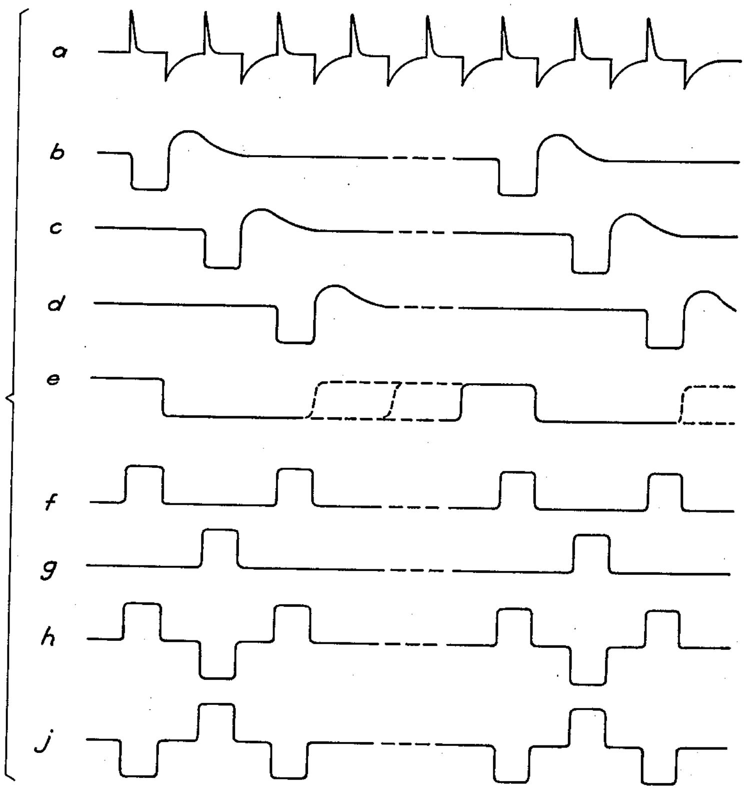
FIG. 6 illustrates several wave forms which appear at various points in the generator shown in FIG. 5.

FIG. 5 is a block diagram of the improved test signal generator contemplated by the invention. FIG. 6 illustrates several wave forms which appear at various points in the generator shown in FIG. 5.

In FIG. 5 a source of clocking pulses 35 is connected through INHIBIT gate 36 to the input of a digit blocking oscillator 39. The source 35 is similarly connected through an AND gate 40 to the input of a digit blocking oscillator 42 and through an AND gate 43 to the input of a digit blocking oscillator 45. The AND gates 40 and 43 shown in FIG. 5 are commonly known devices, each having two input conductors and a single output conductor, characterized by their ability to deliver an output voltage when and only when both of the two input conductors are energized. The blocking oscillators 39, 42 and 45 are also commonly known devices each of which is provided with a single input conductor and two output conductors. These blocking oscillators are capable of delivering an output pulse of predetermined time duration to each of the output conductors whenever the input conductor is energized. The pulse delivered to one output conductor of a blocking oscillator of the type shown in FIG. 5 is of opposite polarity to the pulse delivered to the other output conductor. In this specification the output conductor of a blocking oscillator which delivers a positive pulse will be designated as the "positive output conductor" and, similarly, that conductor which delivers a negative pulse will be designated as the "negative output conductor."

The negative output conductor of digit blocking oscillator 39 is connected to the other input of AND gate 40 and also to the input of inhibit multivibrator 47. The inhibit multivibrator 47 is a monostable multivibrator which has a variable time constant. The source of clocking signals 35 is also connected to the synchronizing input of inhibit multivibrator 47. The output of inhibit multivibrator 47 is connected to the inhibit input of INHIBIT gate 36. The positive output conductors of digit blocking oscillators 39 and 45 are connected to the two input conductors of OR gate 49. OR gate 49 delivers a voltage to its output conductor whenever either of its two input conductors receives a voltage pulse. The positive output conductor of digit blocking oscillator 42 is connected to one input of AND gate 51 and to one input of AND gate 52. The output of OR gate 49 is connected to one input of AND gate 50 and to one input of AND gate 53. The output conductor of AND gate 50 and the output conductor of AND gate 51 are each connected to the one of the input conductors of OR gate 54. The output conductors of AND gates 52 and 53 are connected in a similar manner to the input conductors of OR gate 55.

A free-running, gating multivibrator 57 is equipped with first and second output conductors. The first output conductor of gating multivibrator 57 is connected to one of the inputs of AND gate 50 and to one of the inputs of AND gate 52, the second output conductor of gating multivibrator 57 is connected to one of the inputs of AND gate 53 and to one of the inputs of AND gate 51. The output of OR gate 54 is connected to one input of AND gate 59. The other input conductor of AND gate 59 is connected to the source of clocking signals 35. Similarly, the output of OR gate 55 is connected to one input conductor of AND gate 60 while the other input conductor of AND gate 60 is connected to the source of clocking signals 35. The output of AND gate 59 is connected to the input of the positive output blocking oscillator 62. The output of AND gate 60 is similarly connected to the input of the negative output blocking oscillator 63. The output conductors of blocking oscillators 62 and 63 are connected together by means of the primary winding of output transformer 65. The terminals of the secondary winding of transformer 65 form the output terminals for the device.

The improved signal generator shown in FIG. 5 is capable of generating a fault location testing signal of the type shown in FIG. 3. Since to generate each pattern only three consecutive pulses are needed, three digit blocking oscillators are connected in tandem. The wave form of the clocking pulse train from source 35 is shown on line *a* of FIG. 6. If, for example, the inhibit multivibrator 47 is positive, that is if a negative-going inhibit pulse is not being delivered, a pulse from clock source 35 will pass through INHIBIT gate 36 and trigger the digit blocking oscillator 39. The negative output conductor of digit blocking oscillator 39 then delivers a negative pulse to one of the inputs of AND gate 40 and the positive output conductor delivers a pulse to one input of OR gate 49.

The output characteristics of the three digit blocking oscillators are such that when an output pulse is completed, the output wave form exhibits a substantial amount of "overshoot." This overshoot is illustrated by line *b* of FIG. 6 which shows the output wave form existing on the negative output conductor of digit blocking oscillator 39. The overshoot, when coexisting with a clocking pulse having the same polarity, causes AND gate 40 to deliver an output to digit blocking oscillator 42, thus triggering it. In a similar manner, the positive overshoot following the negative-going pulse from the negative output conductors of digit blocking oscillator 42 triggers digit blocking oscillator 45. The initial pulse from the negative output conductor of digit blocking oscillator 39 also triggers the inhibit multivibrator 47 ON as shown in line *e* of FIG. 6, which illustrates the output wave form from inhibit multivibrator 47. The inhibit multivibrator output remains in this more negative ON position for a time duration determined by the time constant of the inhibit circuit. This output signal inhibits the clock signal in gate 36 thereby preventing digit blocking oscillator 39 from being triggered again until the output of inhibit multivibrator 47 returns to its original state. In this manner the three digit blocking oscillators are capable of producing three consecutive pulses each of which is synchronized with the clocking pulse train as shown in lines *b*, *c* and *d* of FIG. 6.

The first and last of these three consecutive pulses are obtained from the positive output conductors of digit blocking oscillators 39 and 45, respectively, and appear at the output of the OR gate 49 as shown in line *f* of FIG. 6. The second pulse, which is to be of the opposite polarity, is obtained from the positive output of digit blocking oscillator 42. AND gates 50, 51, 52, and 53 in combination with OR gates 54 and 55 and the gating multivibrator 57 make up the inversion circuit which is necessary in order to periodically invert all of the pulses in the repetitious patterns as described earlier. For example, consider that the first (upper) output conductor of multivibrator 57 is ON and the second (lower) is OFF. In this condition the pulses appearing at the output of OR gate 49 are allowed to pass through AND gate 50 and OR gate 54 to the input of AND gate 59 but are prohibited from passing through AND gate 53. Similarly, the output pulse from the positive conductor of digit blocking oscillator 42 is allowed to pass through AND gate 52 and OR gate 55 but is prohibited from passing AND gate 51. When gating multivibrator 57 changes state, the voltages on its output conductors reverse allowing the pulses from OR gate 49 to pass instead to the input of AND gate 60 while the pulses from digit blocking oscillator 42 now pass to AND gate 59. AND gates 59 and 60, since each has one input connected to clock source 35, provide a synchronized input to the blocking oscillator 62 and the blocking oscillator 63, respectively. The output pulse train, which exists alternately in the forms shown on lines *h* and *j* of FIG. 6, is then delivered to the output terminals of the common matching transformer 65, the primary winding of which connects the output blocking oscillators in "push-pull."

By varying the time constant of inhibit multivibrator 47 the repetition rate of the three-digit pattern may be altered. This time constant may be adjusted from a minimum of three time slots (which would place adjacent patterns as closely together as possible) and an upper limit which is determined by the pulse density requirements of the repeaters to be tested. The gating multivibrator 57 is a free-running symmetrical astable device whose period may be adjusted to select a frequency of inversion substantially identical to the responsive frequency of the filter attached to the output of a particular repeater. The adjustment of the period of the gating multivibrator, then adjusts the frequency of the "square wave" component while the adjustment of the time constant of the inhibit multivibrator adjusts its magnitude.

It is to be understood that the test signal generator and the testing operations which have been described above are illustrative of the application of the principles of the invention. Numerous other arrangements of the test signal generator and the testing transducers may be devised without departing from the spirit and scope of the invention.

What is claimed is:

1. In an arrangement for locating a faulty one of a plurality of pulse regenerative repeaters, means to generate a pulse-type testing signal which comprises, in combination, means to generate a first pulse train composed of repetitious patterns of pulses, each of said patterns being characterized by the presence of $m$ pulses of one polarity and $n$ pulses of the opposite polarity, $m$ and $n$ being unequal integers, means to vary the repetition rate of said patterns, and means to invert the polarity of all of pulses in said first pulse train at a variable frequency of inversion to produce said pulse-type testing signal.

2. In an arrangement for locating a faulty one of a plurality of unattended pulse regenerative repeaters which are serially distributed along a transmission path, means to generate a pulse-type testing signal which comprises, in combination, means to generate repetitious patterns of pulses, each of said patterns comprising two pulses of one polarity and one pulse of the opposite polarity, means to vary the rate of repetition of said patterns, and means to invert the polarity of all of the pulses in said repetitious patterns at a variable frequency of inversion to produce said pulse-type testing signal.

3. In combination with a pulse type data transmission system involving unattended repeaters, improved means for generating a testing signal for locating a faulty one of said repeaters which comprises, in combination, means for generating repetitious patterns of ON and OFF pulses, each of said patterns being characterized by its average magnitude differing from the magnitude of said OFF pulses by a particular difference magnitude, means for repeatedly inverting the polarity of all of the ON pulses in said repetitious patterns at a particular frequency of inversion, means for varying said frequency of inversion, and means for varying the repetition rate of said patterns.

4. In combination with a pulse communication system provided with a plurality of pulse regenerative repeaters which are serially connected along a transmission path, improved means for generating a testing signal for locating a faulty one of said repeaters which comprises means to generate a first train of pulses, said first train being characterized by the presence of a discrete direct-current component in its power-density spectrum, means to repeatedly invert the polarity of said component at a particular frequency of inversion, means to adjust the magnitude of said component, and means to adjust said frequency of inversion whereby a second pulse train having a square-wave component of variable frequency and magnitude is produced.

5. In combination with a pulse code transmission path having a plurality of pulse regenerative repeaters, means to locate a faulty or inoperative one of said repeaters which comprises, in combination, a return transmission path, filtering means connected between the output of each of said repeaters and said return transmission path, each of said filtering means being responsive to a frequency peculiar to the location and indicative of the repeater to which it is attached, means to generate a first pulse train, said first pulse train being characterized by the presence of repetitious equal patterns of pulses, each of said patterns comprising *m* pulses of one polarity and *n* pulses of the opposite polarity, *m* and *n* being unequal integers, means to vary the repetition rate of said patterns, means to invert the polarity of all of the pulses in said first pulse train at a variable frequency of inversion to produce a second pulse train, means to transmit said second pulse train over said pulse-code transmission path, and means to detect errors of reproduction produced in any one of said repeaters.

6. Apparatus for generating a train of testing pulses which comprises, in combination, a plurality of single-digit pulse generators connected in tandem, each of said generators provided with an input conductor and at least one output conductor, means for repeatedly applying a triggering voltage to the input of the first of said generators, means for enabling the appearance of a pulse on an output conductor of any one of said generators to trigger the next successive generator, means for inverting the polarity of the output pulses from selected ones of said generators, means for combining all of said output pulses in their original sequence to form a first pulse train, and means for repeatedly inverting all of the pulses in said first pulse train in a predetermined manner.

7. Apparatus in accordance with claim 6 which includes means for varying the rate of application of said triggering voltage and means for varying the rate of inversion of the pulses in said first pulse train.

8. Apparatus for generating a train of ON and OFF pulses which comprises, in combination, a source of clocking pulses, a plurality of serially connected single-digit pulse generators, a source of repetitious initiating pulses, means for triggering the first of said generators whenever one of said initiating pulses coexist with one of said clocking pulses, means for triggering each succeeding one of said generators whenever the first clocking pulse appears after the appearance of an ON pulse at the output of the next preceding one of said generators, means for inverting the polarity of ON pulses from selected ones of said generators, means for combining said ON pulses in their original sequence to form a first pulse train, means for selecting successive groups of a predetermined number of consecutive pulses, and means for inverting all of the ON pulses in alternate ones of said selected groups.

9. An arrangement in accordance with claim 8 which includes means for varying the rate of repetition of said initiating pulses and means for varying the number of consecutive pulses in each of said selected groups of pulses.

10. Means to test a repeatered transmission path which comprises, in combination, means to generate a first pulse train composed of repetitious patterns of pulses, each of said patterns being comprised of *m* pulses of one polarity and *n* pulses of the opposite polarity, means to periodically reverse the polarity of all the pulses in said first pulse train to form a testing pulse train, a repeatered transmission path, means to transmit said testing pulse train over said transmission path, means to detect transmission errors, and means to increase the repetition rate of said patterns whereby the probability of the occurrence of transmission errors is increased.

References Cited in the file of this patent

UNITED STATES PATENTS

| | | |
|---|---|---|
| 2,878,381 | Pentico et al. | Mar. 17, 1959 |
| 2,881,311 | Tykulsky | Apr. 7, 1959 |
| 2,925,492 | Myers et al. | Feb. 16, 1960 |
| 3,010,078 | Stefanov | Nov. 21, 1961 |